United States Patent
Rottoo

[19]

[11] Patent Number: 5,933,417
[45] Date of Patent: Aug. 3, 1999

[54] MULTIMEDIA MULTIPOINT TELECOMMUNICATIONS RESERVATION ACCEPTANCE SYSTEMS AND CONTROLLERS

[75] Inventor: Sunil Rottoo, Montreal, Canada

[73] Assignee: General DataComm, Inc., Middlebury, Conn.

[21] Appl. No.: 08/877,463

[22] Filed: Jun. 16, 1997

[51] Int. Cl.$^6$ .................................................. H04M 3/42
[52] U.S. Cl. ........................................... 370/260; 379/202
[58] Field of Search ..................................... 370/260, 252, 370/253, 261, 270, 468, 477, 259, 262, 263, 271; 379/202, 157, 158, 201, 205, 207, 222; 375/211; 348/15, 16, 17; 395/200.34

[56] References Cited

U.S. PATENT DOCUMENTS

| | | | |
|---|---|---|---|
| 5,638,434 | 6/1997 | Gottlieb et al. | 370/260 |
| 5,689,553 | 11/1997 | Ahuja et al. | 370/260 |

*Primary Examiner*—Dang Ton
*Attorney, Agent, or Firm*—David P. Gordon; David S. Jacobson; Thomas A. Gallagher

[57] ABSTRACT

A multimedia conference reservation controller and reservation acceptance system includes a database of all presently reserved resources on each MMS controlled by the reservation controller which includes an identification of each resource together with the starting time and ending time of the reservation. The acceptance system is designed to accept a reservation query which includes a list of required resources and a list of flexible resources, where flexible resource are considered desirable resources, but not absolutely necessary resources. In response to a reservation query involving a single MMS, the acceptance system accesses the database and builds a list of resources together with the times during which those resources are already reserved. This list is used to create a Resource Availability Matrix which is then analyzed and a list of time periods is generated during which the requested resources are available. In addition, the matrix analysis also indicates exactly which resources must be used to satisfy the request for each time period. In response to a reservation query involving two MMS units, the acceptance system builds two resource availability matrices, one for each MMS which are analyzed to generate a list indicating the time periods during which the conference can be reserved and the resources which must be used.

16 Claims, 9 Drawing Sheets

FIG.3

| Resource | Start_Time | End_Time |
|---|---|---|
| VIP1-1 | t6 | t8 |
| VIP1-2 | t6 | t8 |
| VIP1-3 | t4 | t5 |
| VIP1-4 | t5 | t6 |
| VIP2-1 | t3 | t4 |
| VIP2-2 | t3 | t4 |
| VIP2-2 | t5 | t6 |
| VIP2-2 | t7 | t8 |
| VIP2-3 | t7 | t8 |
| VIP4-1 | t4 | t5 |
| VIP4-2 | t1 | t3 |
| QUAD1 | t1 | t4 |
| QUAD3 | t2 | t8 |

FIG.4

| Resource | Time | S or E |
|---|---|---|
| VIP1-1 | t6 | s |
| VIP1-2 | t6 | s |
| VIP1-3 | t4 | s |
| VIP1-4 | t5 | s |
| VIP2-1 | t3 | s |
| VIP2-2 | t3 | s |
| VIP2-2 | t5 | s |
| VIP2-2 | t7 | s |
| VIP2-3 | t7 | s |
| VIP4-1 | t4 | s |
| VIP4-2 | t1 | s |
| QUAD1 | t2 | s |
| QUAD3 | t8 | e |
| VIP1-1 | t8 | e |
| VIP1-2 | t5 | e |
| VIP1-3 | t6 | e |
| VIP1-4 | t4 | e |
| VIP2-1 | t4 | e |
| VIP2-2 | t6 | e |
| VIP2-2 | t8 | e |
| VIP2-3 | t8 | e |
| VIP4-1 | t5 | e |
| VIP4-2 | t3 | e |
| QUAD1 | t4 | e |
| QUAD3 | t8 | e |

FIG. 5

| Resource | Time | S or E |
|---|---|---|
| VIP4-2 | t1 | s |
| QUAD1 | t1 | s |
| QUAD3 | t2 | s |
| VIP4-2 | t3 | e |
| VIP2-1 | t3 | s |
| VIP2-2 | t4 | e |
| VIP2-1 | t4 | e |
| VIP2-2 | t4 | s |
| QUAD1 | t4 | e |
| VIP1-3 | t4 | s |
| VIP4-1 | t4 | s |
| VIP1-3 | t5 | e |
| VIP4-1 | t5 | e |
| VIP1-4 | t5 | s |
| VIP2-2 | t5 | e |
| VIP1-4 | t6 | e |
| VIP2-2 | t6 | s |
| VIP1-1 | t6 | s |
| VIP1-2 | t6 | s |
| VIP2-2 | t7 | e |
| VIP2-3 | t7 | s |
| VIP1-1 | t8 | e |
| VIP1-2 | t8 | e |
| VIP2-2 | t8 | e |
| VIP2-3 | t8 | e |
| QUAD3 | t8 | e |

FIG. 6

| Time | Required Resources | | | | | | | | | | Flexible Resources | | | FR |
|---|---|---|---|---|---|---|---|---|---|---|---|---|---|---|
| | VIP1- | | | | VIP2- | | | | VIP4- | | QUAD | | | |
| | 1 | 2 | 3 | 4 | 1 | 2 | 3 | 4 | 1 | 2 | 1 | 2 | 3 | |
| T1 | 1 | 1 | 1 | 1 | 1 | 1 | 1 | 1 | 1 | 1 | 0 | 1 | 1 | ok |
| T2 | 1 | 1 | 1 | 1 | 1 | 1 | 1 | 1 | 0 | 1 | 0 | 1 | 0 | no |
| T3 | 1 | 1 | 1 | 1 | 0 | 0 | 1 | 1 | 0 | 1 | 0 | 1 | 0 | no |
| T4 | 1 | 1 | 1 | 0 | 1 | 1 | 1 | 1 | 1 | 1 | 0 | 1 | 0 | ok |
| T5 | 1 | 1 | 1 | 1 | 1 | 1 | 0 | 1 | 0 | 1 | 1 | 1 | 0 | ok |
| T6 | 0 | 0 | 1 | 1 | 1 | 1 | 1 | 1 | 1 | 1 | 1 | 1 | 0 | ok |
| T7 | 0 | 0 | 1 | 1 | 1 | 1 | 0 | 1 | 1 | 1 | 1 | 1 | 0 | ok |
| T8 | 1 | 1 | 1 | 1 | 1 | 1 | 1 | 1 | 1 | 1 | 1 | 1 | 1 | ok |

| Time MIN | VIP1- (need 2) | | | | VIP2- (need 2) | | | | VIP4- (need 1) | | Total Avail | Avail. Time Period |
|---|---|---|---|---|---|---|---|---|---|---|---|---|
| T1      | 1 | 1 | 1 | 1 | 1 | 1 | 1 | 1 | 1 | 0 |   |   |
| T2          | 1 | 1 | 1 | 1 | 1 | 1 | 1 | 1 | 1 | 0 |   |   |
| MIN(T1-T2)  | 1 | 1 | 1 | 1 | 1 | 1 | 1 | 1 | 1 | 0 | 9 | T1-T3 |
| T3          | 1 | 1 | 1 | 1 | 0 | 0 | 1 | 1 | 1 | 1 |   |   |
| MIN(T1-T3)  | 1 | 1 | 1 | 1 | 0 | 0 | 1 | 1 | 1 | 0 | 7 | T1-T4 |
| T4          | 1 | 1 | 0 | 1 | 1 | 1 | 1 | 1 | 0 | 1 |   |   |
| MIN(T1-T4)  | 1 | 1 | 0 | 1 | 0 | 0 | 1 | 1 | 0 | 0 | 5 | - |
| T2      | 1 | 1 | 1 | 1 | 1 | 1 | 1 | 1 | 1 | 0 |   |   |
| T3          | 1 | 1 | 1 | 1 | 0 | 0 | 1 | 1 | 1 | 1 |   |   |
| MIN(T2-T3)  | 1 | 1 | 1 | 1 | 0 | 0 | 1 | 1 | 1 | 0 | 7 | T2-T4 |
| T4          | 1 | 1 | 0 | 1 | 1 | 1 | 1 | 1 | 0 | 1 |   |   |
| MIN(T2-T4)  | 1 | 1 | 0 | 1 | 0 | 0 | 1 | 1 | 0 | 0 | 5 | - |
| T3      | 1 | 1 | 1 | 1 | 0 | 0 | 1 | 1 | 1 | 1 |   |   |
| T4          | 1 | 1 | 0 | 1 | 1 | 1 | 1 | 1 | 0 | 1 |   |   |
| MIN(T3-T4)  | 1 | 1 | 0 | 1 | 0 | 0 | 1 | 1 | 0 | 1 | 6 | T3-T5 |
| T5          | 1 | 1 | 1 | 0 | 1 | 0 | 1 | 1 | 1 | 1 |   |   |
| MIN(T3-T5)  | 1 | 1 | 0 | 0 | 0 | 0 | 1 | 1 | 0 | 1 | 5 | T3-T6 |
| T6          | 0 | 0 | 1 | 1 | 1 | 1 | 1 | 1 | 1 | 1 |   |   |
| MIN(T3-T6)  | 0 | 0 | 0 | 0 | 0 | 0 | 1 | 1 | 0 | 1 | 3 | - |
| T4      | 1 | 1 | 0 | 1 | 1 | 1 | 1 | 1 | 0 | 1 |   |   |
| T5          | 1 | 1 | 1 | 0 | 1 | 0 | 1 | 1 | 1 | 1 |   |   |
| MIN(T4-T5)  | 1 | 1 | 0 | 0 | 1 | 0 | 1 | 1 | 0 | 1 | 6 | T4-T6 |
| T6          | 0 | 0 | 1 | 1 | 1 | 1 | 1 | 1 | 1 | 1 |   |   |
| MIN(T4-T6)  | 0 | 0 | 0 | 0 | 1 | 0 | 1 | 1 | 0 | 1 | 4 | - |
| T5      | 1 | 1 | 1 | 0 | 1 | 0 | 1 | 1 | 1 | 1 |   | T5-T6 |
| T6          | 0 | 0 | 1 | 1 | 1 | 1 | 1 | 1 | 1 | 1 |   |   |
| MIN(T5-T6)  | 0 | 0 | 1 | 0 | 1 | 0 | 1 | 1 | 1 | 1 | 6 | - |
| T6      | 0 | 0 | 1 | 1 | 1 | 1 | 1 | 1 | 1 | 1 |   |   |
| T7          | 0 | 0 | 1 | 1 | 1 | 0 | 0 | 1 | 1 | 1 |   |   |
| MIN(T6-T7)  | 0 | 0 | 1 | 1 | 1 | 0 | 0 | 1 | 1 | 1 | 6 | T6-T8 |
| T8          | 1 | 1 | 1 | 1 | 1 | 1 | 1 | 1 | 1 | 1 | 10 | T6-T8 |

RAMs

| Time | VIP1- | | | VIP2- | | | VIP4- | |
|---|---|---|---|---|---|---|---|---|
| ST1 | 1 | 1 | 0 | 1 | 0 | 1 | 1 | 1 |
| ST2 | 1 | 1 | 0 | 1 | 1 | 1 | 1 | 0 |
| ST3 | 1 | 1 | 1 | 1 | 0 | 0 | 0 | 1 |
| ST4 | 1 | 1 | 1 | 1 | 0 | 0 | 0 | 0 |
| ST5 | 0 | 0 | 0 | 0 | 1 | 1 | 0 | 0 |
| ST6 | 1 | 1 | 0 | 0 | 1 | 0 | 0 | 0 |
| ST7 | 1 | 1 | 1 | 0 | 0 | 1 | 0 | 1 |
| ST8 | 0 | 0 | 1 | 0 | 0 | 0 | 0 | 0 |
| ST9 | 1 | 1 | 0 | 1 | 0 | 1 | 1 | 1 |

FIG. 8a

RAMm

| Time | VIP1- | | | VIP2- | | | VIP4- | |
|---|---|---|---|---|---|---|---|---|
| MT1 | 1 | 1 | 1 | 1 | 1 | 0 | 1 | 1 |
| MT2 | 1 | 1 | 0 | 1 | 1 | 1 | 1 | 1 |
| MT3 | 0 | 0 | 0 | 1 | 0 | 0 | 1 | 1 |
| MT4 | 1 | 1 | 1 | 0 | 1 | 0 | 0 | 0 |
| MT5 | 1 | 0 | 1 | 0 | 1 | 1 | 1 | 1 |
| MT6 | 1 | 1 | 1 | 1 | 1 | 1 | 0 | 0 |

FIG. 9a MCRAM

| Time | VIP1- | | | | VIP2- | | | | VIP4- | |
|---|---|---|---|---|---|---|---|---|---|---|
| ST1 | 1 | 1 | 1 | 1 | 1 | 1 | 0 | 0 | 1 | 1 |
| ST2 | 1 | 1 | 1 | 1 | 1 | 1 | 0 | 0 | 1 | 1 |
| MT2 | 1 | 0 | 0 | 1 | 1 | 1 | 1 | 1 | 1 | 1 |
| MT3 | 0 | 1 | 1 | 1 | 1 | 1 | 0 | 0 | 1 | 1 |
| ST3 | 0 | 1 | 1 | 1 | 1 | 1 | 0 | 0 | 1 | 1 |
| ST4 | 0 | 1 | 1 | 1 | 1 | 1 | 0 | 0 | 1 | 1 |
| ST5 | 0 | 1 | 1 | 1 | 1 | 1 | 0 | 0 | 1 | 1 |
| ST6 | 0 | 1 | 1 | 1 | 1 | 1 | 0 | 0 | 1 | 1 |
| MT4 | 1 | 0 | 0 | 1 | 0 | 0 | 0 | 0 | 0 | 0 |
| MT5 | 1 | 0 | 0 | 1 | 0 | 0 | 1 | 1 | 1 | 1 |
| ST7 | 1 | 0 | 0 | 1 | 0 | 0 | 1 | 1 | 1 | 1 |
| ST8 | 1 | 0 | 0 | 1 | 0 | 0 | 1 | 1 | 1 | 1 |
| MT6 | 1 | 1 | 1 | 1 | 0 | 0 | 1 | 1 | 0 | 0 |

FIG. 9b SCRAM

| Time | VIP1- | | | | VIP2- | | | | VIP4- | |
|---|---|---|---|---|---|---|---|---|---|---|
| ST1 | 1 | 1 | 1 | 0 | 0 | 1 | 1 | 1 | 1 | 1 |
| ST2 | 1 | 1 | 0 | 0 | 1 | 1 | 0 | 1 | 1 | 0 |
| MT2 | 0 | 1 | 1 | 1 | 1 | 1 | 0 | 1 | 1 | 0 |
| MT3 | 1 | 1 | 0 | 1 | 1 | 1 | 0 | 1 | 1 | 0 |
| ST3 | 1 | 1 | 0 | 1 | 1 | 0 | 0 | 0 | 1 | 0 |
| ST4 | 1 | 1 | 1 | 1 | 1 | 1 | 1 | 1 | 1 | 1 |
| ST5 | 0 | 0 | 0 | 0 | 0 | 0 | 0 | 0 | 0 | 0 |
| ST6 | 1 | 0 | 0 | 0 | 0 | 1 | 0 | 0 | 0 | 0 |
| MT4 | 1 | 0 | 0 | 0 | 0 | 1 | 0 | 0 | 0 | 0 |
| MT5 | 1 | 0 | 0 | 0 | 0 | 1 | 0 | 0 | 0 | 0 |
| ST7 | 1 | 1 | 1 | 0 | 0 | 1 | 1 | 0 | 1 | 0 |
| ST8 | 1 | 1 | 0 | 0 | 0 | 0 | 0 | 0 | 0 | 0 |
| MT6 | 1 | 1 | 0 | 0 | 0 | 0 | 0 | 0 | 0 | 0 |

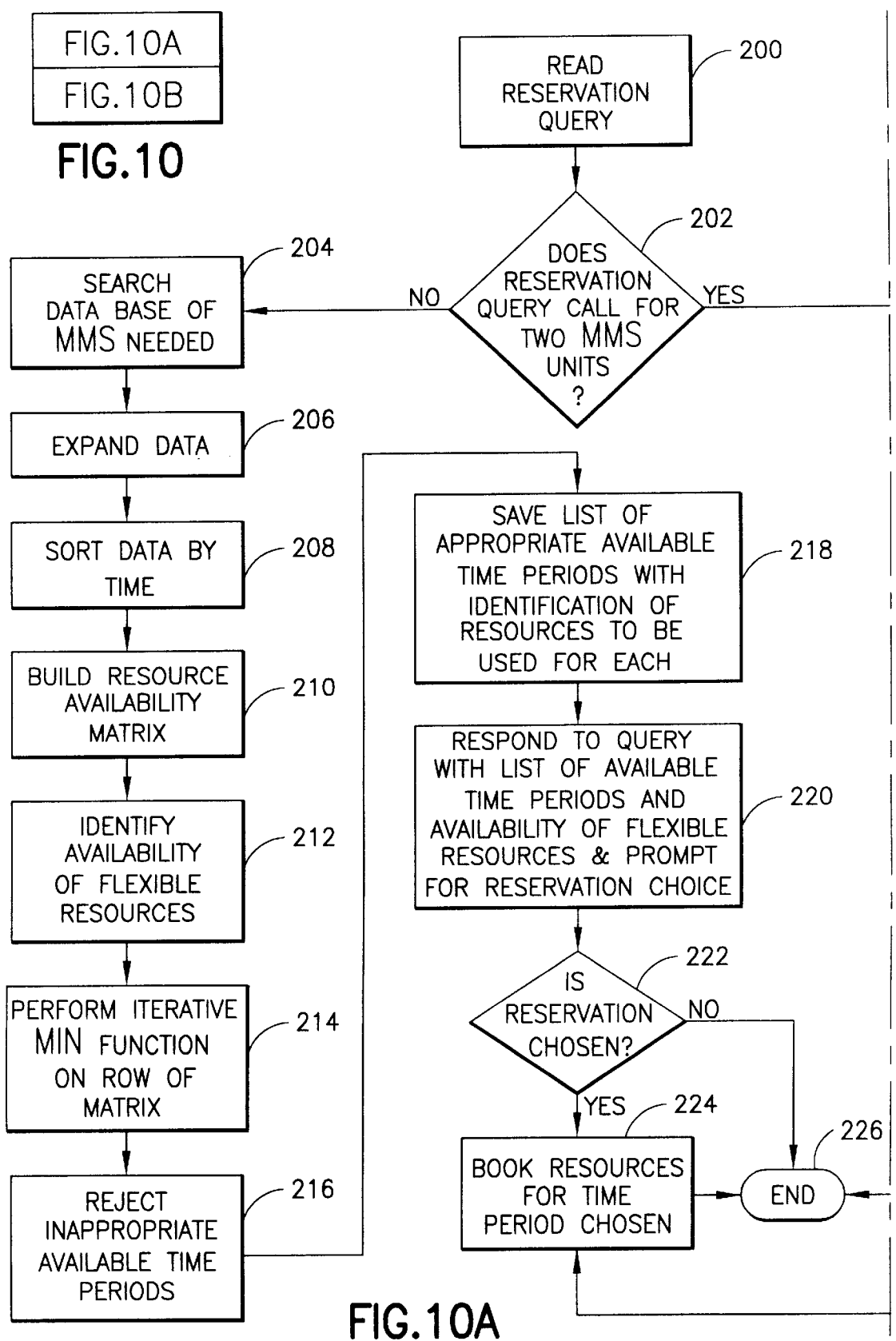

MULTIMEDIA MULTIPOINT TELECOMMUNICATIONS RESERVATION ACCEPTANCE SYSTEMS AND CONTROLLERS

This application is related to co-owned, allowed application Ser. No. 08/586,259, filed Jan. 16, 1996 now U.S. Pat. No. 5,680,392, for Multimedia Multipoint Telecommunications Reservation Systems, the complete disclosure of which is hereby incorporated by reference herein.

BACKGROUND

1. Field of the Invention

The present invention relates broadly to multipoint multimedia telecommunications systems. More particularly, the present invention relates to reservation systems for the use of multimedia multipoint servers which are used in the establishment and conduct of multipoint multimedia conferences. Most particularly, the invention relates to an acceptance system which manages the allocation of Multipoint Multimedia Server (MMS) resources to specific conferences.

2. State of the Art

With the increase of throughput (data rate) available in the telecommunications industry, and in association with the improvement of compression and decompression algorithms, the number of telecommunication applications available to individuals and businesses has increased dramatically. One of these applications is called "multimedia communications" which permits video, audio, and in some cases other data to be transported from one party to another or others. Multimedia communications can be utilized for a number of applications, and in different configurations. One configuration of recent interest has been multimedia conferencing, where several parties can communicate in a conference style.

In multimedia conferencing, the audio and video data is handled such that each party can see and hear one, several, or all of the other parties. In fact, various telecommunications recommendations and standards are presently being adopted by the ITU-T, ISO, and Bellcore which govern the protocols of multimedia conferencing (see, e.g., ITU-T T.120, H.323, H.320, etc.). In the multimedia conferencing systems of the art (as represented by prior art FIG. 1), the audio, video, and other data streams generated by a user's system 12a are multiplexed together directly in the encoder section of a multimedia encoder/decoder (codec) 14 located at the source/terminal 16, and transported together through the transport network 20 (now proposed in ATM format) to a similar "peer" codec at a remote location. The peer codec is either another codec 14 at the remote user site for a point-to-point conference, and/or a codec/switch 24 at a multimedia bridge 26 (also called a Multipoint Multimedia Server or MMS) for a multipoint conference. The MMS 26, which typically includes a codec/switch 24 and a controller 28, provides conference control (e.g., it determines the signal to be sent to each participant), audio mixing (bridging) and multicasting, audio level detection for conference control, video switching (e.g., voice activated video switching), video mixing or mosaic (e.g., a quad split, or "continuous presence device" which combines multiple images for display together) when available and/or desirable, and video multicasting. The audio and video data exiting the MMS is multiplexed, and continues through the transport network 20 to the desired multimedia source terminals 12b, 12c.

It will be appreciated by those skilled in the art that the MMS is technically complex and expensive, and that use of the MMS is carefully controlled and billed to the user. In addition, it will be appreciated that because of its expense and limited availability, MMS ports are treated as rare resources. Thus, in order to guarantee to a given user the necessary resources for a desired conference at a given time, the user must reserve access to the MMS in advance of use. Reservations are made by a "reservation request" which may involve a telephone call to an operator at the company controlling the MMS or a TCP/IP connection from a client's PC to a server. In response to a reservation request, which will often include parameters such as a starting time, a duration, and resources necessary (e.g., bandwidth, mixing and switching, etc.), the operator (or PC user client) will typically access a "reservation controller", which is typically a programmed computer (specialized server), in order to determine whether the required resources of the MMS will be available at the desired time. The operator (or client) will enter information related to the desired connections and services for the given time. The reservation will be accepted only if all of the requested resources are available. Upon acceptance of the reservation, the client will be informed of codes (e.g., a reservation number, access password, etc.) required for the conference. When the time is reached for the conference, the reservation controller will inform the MMS of the beginning of a new conference and the precise resources reserved for that conference. When the users wish to join the conference and access the MMS, the users connect to the MMS, provide the reservation number (or access password), and are added to the conference, with the necessary resources having been already reserved and available.

3. Co-owned Technology

Turning to FIG. 2, a hypothetical telecommunications system is shown and includes a plurality of users 112a–112l (typically coupled to the network 20—see FIG. 1), a plurality of MMS units 126a–126d (typically located in the network), and a plurality of reservation controllers 130a, 130b (typically coupled to and/or located at the MMS units). Each reservation controller 130a, 130b, is shown coupled to two MMS units, while each MMS is shown servicing three users. It will be appreciated by those skilled in the art that depending upon its configuration and the needs of the users, each MMS can service many more than three users; and depending upon similar parameters, each reservation controller can service more than two MMS units. However, for purposes of simplicity of understanding, two reservation controllers, four MMS units, and twelve users are shown. With the provided arrangement, it will be appreciated that if users 112c, 112e, 112f, 112g, 112h, and 112j should wish to participate in a multimedia conference, the services of the four different MMS units 126a–126d will be required. Thus, the two reservation controllers 130a, 130b must be contacted to reserve appropriate access and processing of the MMS units. However, with the systems that presently exist in the art, if the MMS units and reservation controllers are owned and operated by different companies, it may be impossible to arrange such a multimedia conference. In addition, with the provided arrangement it is not evident to which reservation controller the user should forward a reservation request, and how the reservation controllers will share the information contained in the request among themselves.

As seen in FIG. 2a, and in accord with the invention disclosed in previously incorporated co-owned, allowed application Ser. No. 08/586,259, one of the reservation controllers 130a, 130b of the hypothetical telecommunications system of FIG. 2 initiates and establishes a "reservation domain" which is provided with (typically upon request) a "reservation request channeled" 135; and the other of reservation controllers attaches itself to the established reservation domain and joins the reservation request channel 135. The reservation domain is associated with a "reservation conference" (which if desired, may be pursuant to ITU-T T.124) and attachment to the reservation domain is accomplished by joining the conference. As is defined by ITU-T T.122 (MCS), any node (users, reservation controllers, MMS units, etc.) which attaches itself to a domain will be assigned a private channel (also called a "single member channel"). The private channel is normally used as a user identifier which provides a user identification and serves as an address for point-to-point communication within the multipoint domain. However, within T.122, another type of channel called a multicast channel can be defined to which any number of nodes can be joined. The reservation channel 135 is such a multicast channel.

It should be appreciated by those skilled in the art that any node which is attached to the domain can send data on any channel in the domain (the ability to send data being shown by dotted lines in FIG. 2a). However, only nodes which have joined a particular channel will receive the data sent on that particular channel (the ability to receive data being shown by solid lines in FIG. 2a). Thus, any node wishing to send private data to any other node will do so by sending this data on the private channel of the destination node, with representative private channels 147c and 147i being shown in FIG. 2a for users 112c and 112i.

A user who wishes to make a reservation will join the reservation conference and must attach himself to the reservation domain, but will not join the reservation request channel. Once attached to the reservation domain, the user can attempt to place a reservation by sending a reservation request onto the reservation request channel 135. The reservation request will typically include a plurality of multimedia conference parameters such as the starting time, the duration, the addresses of the users involved, and the resources necessary for the conference. In addition, the user will specify his own private channel address for reservation confirmation. Since the reservation controllers 130a, 130b are party to the reservation domain and have joined the reservation request channel, the parameters placed on the reservation request channel 135 are available to (i.e., are received by) the reservation controllers 130a and 130b.

Where the set of users who will be party to the multimedia conference all are serviceable by a single MMS (such as users 112d, 112e, and 112f), then the reservation controller (e.g., 130b) for that single MMS (e.g., MMS 126b) will make a determination as to whether the necessary MMS 126b resources will be available for the requested conference for the time requested. If so, the reservation controller 130b will confirm the reservation with the conference-initiating user via the private channel of the user. Where the set of users who will be party to the multimedia conference are not all serviceable by a single MMS (such as users 112a, 112b, and 112g), but a single reservation controller (e.g., controller 130a) is involved, again, the reservation controller can determine whether resources are available and can confirm the reservation with the conference-initiating user via the private channel of the user. However, where the set of users who will be party to the multimedia conference are serviced by multiple MMS units which are serviced by multiple reservation controllers, (such as users 112c, 112e, and 112f), then the reservation controller(s) (e.g., 130a, 130b) for the MMS units involved (e.g., MMS units 126a, 126b) will make determinations as to whether the necessary resources of the MMS units 126a, 126b under their control will be available for the requested conference for the time requested.

Determination as to the availability of MMS resources which are governed by multiple reservation controllers can be accomplished in several ways as disclosed in the previously incorporated co-owned, allowed application Ser. No. 08/586,259.

According to the state of the art and the co-owned technology, resources are managed and allocated, and reservations are accepted or denied on the basis of a group of requested resources. Thus, if any one of the requested resources is unavailable, the reservation will not be accepted. In other words, all of the requested resources must be available at the same starting time and for the same duration. This type of reservation acceptance system may be considered unduly restrictive since some of the resources requested for a conference may not be needed for the full duration of the conference. For example, if a conference requires an audio link and a video link for four hours and a VCR resource for one of the four hours, the VCR must still be reserved for the full four hours. Therefore, if a VCR resource is not available for the full duration of the conference, the reservation will not be accepted. On the other hand, if a VCR is available for the full duration of the conference, the VCR resource will be unavailable to others for three hours during which it is not really being used.

The state of the art reservation acceptance systems also often fail to provide a reservation requestor with much useful information other than whether a reservation has been accepted or not. Therefore, in the case of an unaccepted reservation, the requester may be left guessing as to which resource(s) were unavailable to fulfill the reservation. Moreover, the state of the art request query usually involves specifying a starting time, a duration, and a set of resources needed to conduct a conference for the duration starting at the starting time. In the case of a unaccepted reservation, the requester may need to submit multiple queries before a conference can be reserved.

SUMMARY OF THE INVENTION

It is therefore an object of the invention to provide a reservation controller for multimedia multipoint servers.

It is another object of the invention to provide a reservation acceptance system in which a reservation query can contain a list of required resources and flexible resources.

It is a further object of the invention to provide a reservation acceptance system in which a response to a reservation query includes a list of time periods during which the reservation may be accepted.

It is an additional object of the invention to provide a reservation acceptance system in which a response to a reservation query includes a list of time periods during which the reservation may be accepted for required resources and a list of time periods during which the reservation may be accepted for both required resources and flexible resources.

Another object of the invention is to provide a reservation acceptance system which indicates to the reservation controller the exact identity of which resources must be utilized to accept a reservation.

A further object of the invention is to provide a reservation acceptance system which can accept queries for resources on multiple MMS units.

An additional object of the invention is to provide a reservation controller which indicates the exact identity of which resources must be utilized to accept a reservation involving multiple MMS units.

Yet another object of the invention is to provide a reservation acceptance system which responds to user queries with easy to understand information about when a reservation may be accepted.

In accord with the objects of the invention, the reservation controller and reservation acceptance system according to the invention includes a database of all presently reserved resources on each MMS controlled by the reservation controller. The database includes an identification of each resource which has been reserved together with the starting time and ending time of the reservation. The acceptance system is designed to accept a reservation query which includes a list of required resources and a list of flexible resources, where flexible resource are considered desirable resources, but not absolutely necessary resources. The reservation query may, optionally include one or more time periods during which the resources are desired to be reserved.

In response to a reservation query involving a single MMS, the acceptance system accesses the database of reserved resources and builds a list of the resources requested in the query together with the times during which those resources are already reserved. This list is expanded to form a list of resources where each record in the list includes a resource identification, a time, and an indication of whether the time is the start of a reserved period or the end of a reserved period. This expanded list is sorted by the time field (listing the ending times before the starting times when two or more time fields are the same) and is used to create a two dimensional Resource Availability Matrix. One dimension of the matrix is the ordered identification of resources (e.g. $R_1-R_n$) and the other dimension of the matrix is an ordered list times (e.g. $T_1-T_n$) at which the availability of resources changes. The entries in the matrix are binary values indicating the availability or unavailability of a resource at a given time. The matrix is then analyzed by comparing the availability of resources $R_1-R_n$ at the earliest time $T_1$ with the availability of resources at each subsequent time $T_2$, $T_3$, etc. to determine the longest contiguous period starting at $T_1$ during which all of the required resources are available. This analysis is reiterated for each subsequent time $T_2$, $T_3$, etc. and a list of time periods is generated during which the requested resources are available. In addition, the matrix analysis also indicates exactly which resources of a particular type must be used to satisfy the request for each time period. The former information (the list of time periods) is used to respond to the user query. Both the former information and the latter information (which resources of a particular type must be used) is used to set up a reservation with the reservation controller. If the analysis reveals that during certain time periods, multiple resources of the same type are available, the actual resources utilized to reserve the conference may be chosen randomly or may be chosen according to other criteria such as cost.

In response to a reservation query involving two MMS units, the acceptance system accesses the database of reserved resources for each MMS and builds a list for each MMS of the resources requested in the query together with the times during which those resources are already reserved. This two lists are expanded to form two lists of resources where each record in the list includes a resource identification, a time, and an indication of whether the time is the start of a reserved period or the end of a reserved period. These expanded lists are sorted by the time field and are used to create two two-dimensional resource availability matrices, one for each MMS. One of the MMS units is considered to be a master and the other is considered to be a slave. The master and the slave will be coupled to each other by N-number of network ports where the number N is specified in the query. The type of ports used to couple the master and slave will be chosen by the acceptance system and is not specified in the query.

After the two matrices are generated, the time dimension of each matrix is interleaved with the other so that each matrix now includes time elements which indicate when resource availability changes in the other. In other words the matrix for the master MMS will include extra entries to indicate times where resource availability changes in the slave matrix and vice versa. The two resulting matrices will thus have the same dimensions. For each time element in the matrices, the resource availability at that time in each matrix is compared to the query request to determine whether the time element being considered can be used as a start time for a conference. If it is determined, e.g. at $T_1$, that sufficient resources are available at both the master and the slave to communicate with each other, $T_1$ is indicated as a possible starting time for a conference reservation. The resources available at both the master and the slave at time $T_1$ are then compared to the resources available at $T_2$ to determine which of the resources which were available at $T_1$ continue to be available at $T_2$. If the available resources at $T_2$ are sufficient to continue the conference, the resources at $T_3$ are analyzed, etc. This procedure is reiterated starting at $T_2$, then starting at $T_3$, etc. A list is thereby generated indicating the time periods during which the conference can be reserved. If the analysis reveals that during certain time periods, multiple resources of the same type are available, the available resources at the master and slave are compared to ensure that the master and slave choose the same type of resource for intercommunication between the master and the slave.

Additional objects and advantages of the invention will become apparent to those skilled in the art upon reference to the detailed description taken in conjunction with the provided figures.

BRIEF DESCRIPTION OF THE DRAWINGS

FIG. 3 is a table illustrating a list of requested resources with the time periods during which those resources have been previously reserved;

FIG. 4 is a table illustrating the information from FIG. 3 in expanded form;

FIG. 5 is a table illustrating the information from FIG. 4 sorted by time;

FIG. 6 is a table illustrating a Resource Availability Matrix;

FIG. 7 is a table illustrating the analysis performed on the Resource Availability Matrix according to the invention;

FIG. 8a is a table illustrating a Resource Availability Matrix for a "master" MMS unit for a reservation involving two MMS units;

FIG. 8b is a table illustrating a Resource Availability Matrix for a "slave" MMS unit for a reservation involving two MMS units;

FIG. 9a is a table illustrating a Consolidated Resource Availability Matrix for a "master" MMS unit for a reservation involving two MMS units;

FIG. 9b is a table illustrating a Consolidated Resource Availability Matrix for a "slave" MMS unit for a reservation involving two MMS units.

DETAILED DESCRIPTION OF THE PREFERRED EMBODIMENTS

Figure 1:
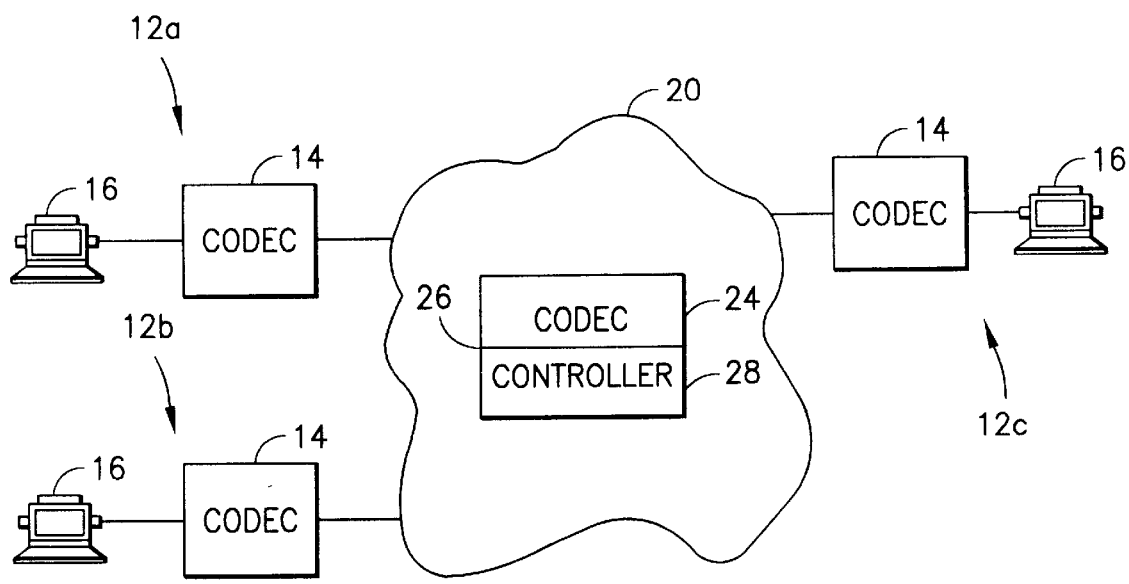
FIG. 1 is a representation of a multimedia conferencing system of the prior art, including a telecommunications network and an MMS unit.
Figure 2:
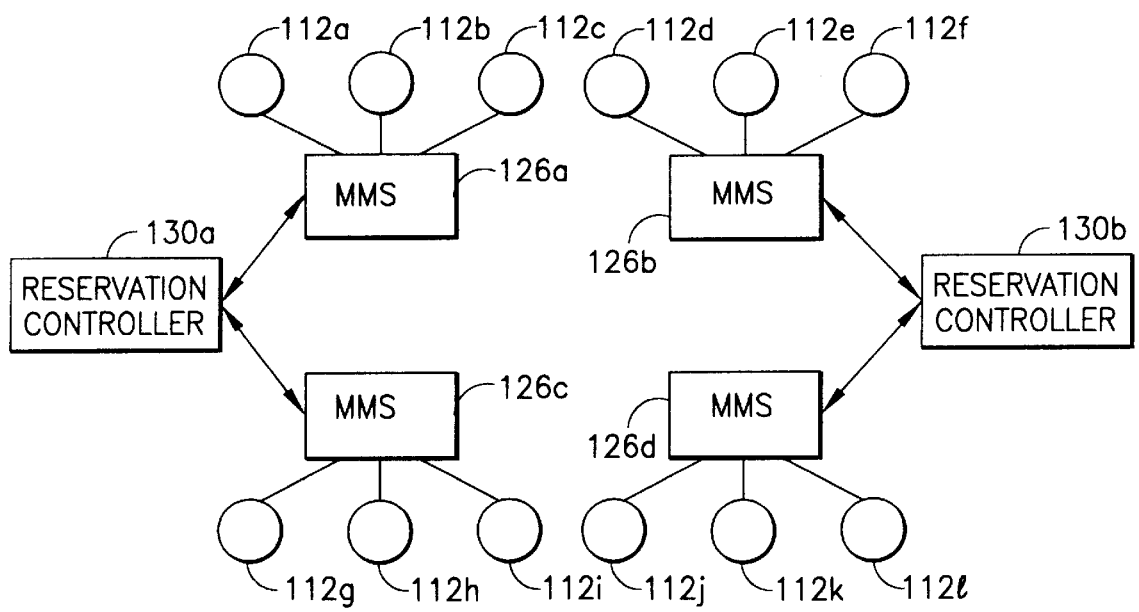
FIG. 2 is a high level diagram showing a system with a plurality of users, a plurality of MMS units, and a plurality of reservation controllers.
Figure 2A:
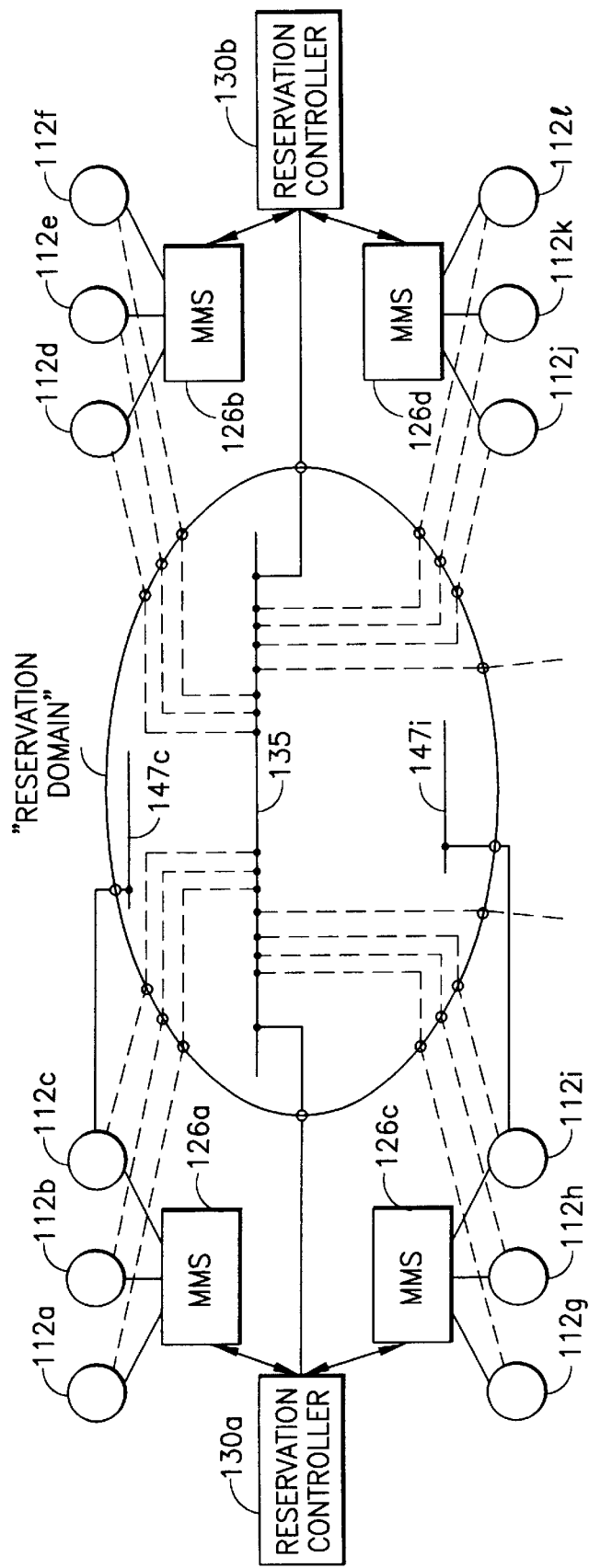
FIG. 2a is a high level diagram showing the system of FIG. 2 with the reservation domain and reservation request channel.

The reservation controller and reservation acceptance system according to the invention includes a database of all presently reserved resources on each MMS controlled by the reservation controller. The database includes an identification of the resource which has been reserved together with the starting time and ending time of the reservation. The acceptance system is designed to accept a reservation query which includes a list of required resources and a list of flexible resources, where flexible resource are considered desirable resources, but not absolutely necessary resources. The reservation query may optionally include one or more time periods during which the resources are desired to be reserved.

A first embodiment of the invention will be explained with reference to an MMS (such as a GDC APEX MMS) which has 32 ports: 22 local ports, 10 remote ports (4 VIP1, 4 VIP2, and 2 VIP4), and 3 quads. The VIP1 ports support Motion JPEG, the VIP2 ports support H.320, and the VIP4 ports support MPEG2. The quads are devices which allow the mixing of several video signals so that many conference participants can be seen on a single video screen. An example of a reservation query requests a one hour reservation for three specific local ports and five remote ports of which at least two must be VIP1, two must be VIP2, and one must be VIP4. In addition, the reservation query requests two quads as flexible resources, i.e. resources which are desirable but not mandatory. Since the local ports are specifically designated (i.e. directly coupled to local conference sites), the time periods during which those ports (sites) are available will be a primary determinant of when (or whether) the reservation can be accepted. With regard to the remote ports, however, any of the available ports of the type requested can be used to accept the reservation.

The first step in processing the reservation query is to obtain a list of reserved resources during the times that the local ports are available. FIG. 3 shows an example of a list of reserved resources which includes an identification of the resource and the starting and ending time of the reservation. Thus, in this particular example, FIG. 3 shows that the first and second VIP1 ports will be unavailable from time t6 through t8, the third VIP1 port will be unavailable from t4 through t5, the fourth VIP1 port will be unavailable from t5 through t6, etc. It is noted that the time designations t1–t8 are not specific preset times, but rather represent times at which the status of one or more resources change.

This list is expanded to form a list of resources where each record in the list includes a resource identification, a time, and an indication of whether the time is the start of a reserved period or the end of a reserved period. FIG. 4 shows how the list is expanded. This expanded list is sorted by the time field as shown in FIG. 5. Thus, FIG. 5 indicates that at t1 the second VIP4 port and the first Quad become unavailable, at t2 the third Quad becomes unavailable, at t3 the second VIP4 port becomes available, etc. It should be noted that where some resources change availability at the same time, the resource which is becoming available should be listed before the resource which is becoming unavailable. The chronological list of FIG. 5 is used to create a two dimensional Resource Availability Matrix seen in FIG. 6.

Turning now to FIG. 6, the Resource Availability Matrix according to this example includes thirteen columns, each corresponding to a resource of the type requested in the reservation query, e.g four columns for the VIP1 ports, four columns for the VIP2 ports, two columns for the VIP4 ports, and three columns for the Quads. In addition, the Resource Availability Matrix according to this example includes eight rows, each corresponding to a time during which the availability of a resource changes, i.e. the starting times and ending times from the lists of FIGS. 3–5. At the intersection of the rows and the columns, the availability of a particular resource at a particular time is indicated by a one or a zero where a one indicates that the resource is available and a zero indicates that the resource is not available. Thus, as seen in FIG. 6, the first VIP1 port is available from t1 until t6, is unavailable from t6 until t8, and becomes available again at t8. With regard to the flexible resources, the times during which the request for flexible resources can be satisfied are marked in the column FR. Thus, the only time during which the requested flexible resources cannot be reserved is from t2 until t4. With regard to the required resources, the matrix is analyzed as described below with reference to FIG. 7. Prior to this analysis, however, the matrix may be pruned by reference to other conference parameters such as the availability of sites and/or the availability of conference participants. For example, if one of the required conference participants is not available from time t1 until time t3, the first two rows of the matrix will be ignored in the following analysis.

Turning now to FIG. 7, and in accord with a preferred embodiment of the invention, the analysis of the matrix to determine the time slots during which the required resources can be reserved to satisfy the query is performed by iterative application of a simple MIN function. For example, starting with t1, each column of the matrix row at t1 is compared to the corresponding column in the row at t2. The minimum value is obtained and is indicated in FIG. 7 at MIN(T1–T2). The sum of the available resources at MIN(T1–T2) is obtained and is compared to the total number of required resources. In this example, the total number of required resources is five and the total number of available resources at MIN(T1–T2) is nine. If the total number of available resources at any time period falls below the total number of required resources, no further analysis for that time period is performed.

Provided that the total number of available resources at a particular time does not fall below the total number of resources required, a resource by resource check is made. As indicated at MIN(T1–T2), all of the required resources are available from time t1 until time t3. The results of MIN (T1–T2) are then compared to the columns at t3 to determine whether the required resources will be available from t1 until t4. This availability is indicated in FIG. 7 at MIN (T1–T3) which shows that the required resources can be reserved for the period t1 until t4. The results of MIN (T1–T3) are then compared to the columns at t4 to determine whether the required resources will be available from t1 until t5. This comparison is indicated in FIG. 7 at MIN (T1–T4) which indicates that although there are five resources available throughout the period, neither one of the two VIP4 ports is available for the entire time period starting t1 and ending t5. It will be noted that although one or another VIP4 port is available throughout the time period, it is necessary that the same port be available throughout the period for the reservation to be accepted. Therefore, the longest contiguous time period starting at t1 during which a reservation may be accepted is the time period starting at t1 and ending at t4 which is indicated in FIG. 7 at MIN (T1–T3). It will be appreciated that during the time period starting at t1 and ending at t4, any two of the four VIP1 ports may be used, the third and fourth VIP2 ports may be used, and the first VIP4 port may be used.

As mentioned above, the analysis of the matrix continues iteratively with each succeeding time. The longest contiguous time period starting at t2 during which a reservation may be accepted is the time period starting at t2 and ending at t4 which is indicated in FIG. 7 at MIN(T2–T3). The longest contiguous time period starting at t3 during which a reservation may be accepted is the time period t3 until t6 which is indicated in FIG. 7 at MIN(T3–T5). It will be appreciated that during the time period t3 to t6, the first two of the four VIP1 ports may be used, the third and fourth VIP2 ports may be used, and the second VIP4 port may be used. The longest contiguous time period starting at t4 during which a reservation may be accepted is the time period t4 until t6 which is indicated in FIG. 7 at MIN(T4–T5). It will be appreciated that during the time period t4 to t6, the first two of the four VIP1 ports may be used, all but the second of the four VIP2 ports may be used, and the second VIP4 port may be used. Although a reservation may be accepted for the time t5–t6 and a reservation may be accepted for the time t6–t8, different ports will be available starting at t6. Therefore, the final analysis of the matrix reveals that the reservation may be accepted for any time within the ranges t1–t4, t2–t4, t3–t6, t4–t6, t5–t6, or t6–t8. Since some of these time periods are subsumed within other time periods, the overlapping time periods can be removed to simplify the list to: t1–t4, t3–t6, and t6–t8. As mentioned above, the example query requested resources for a one hour conference. If any of the time periods t1–t4, t3–t6, or t6–t8 is less than one hour, it will be removed from the list of periods during which a conference may be accepted (because the reservation query specified a one hour conference). In addition, as suggested above, the available time periods for the required resources are compared to the available time periods for the flexible resources (t1–t2 and t4–t8) to create a list which is reported to the user who made the reservation query. In addition, for each time period during which the reservation may be accepted, the exact ports which must be used to satisfy the request are indicated. The identities of the ports which must be used are not reported to the user, but are used when the reservation is booked.

Those skilled in the art will appreciate that the first embodiment of the invention described above will operate to determine when a reservation utilizing a single MMS unit may be accepted. According to a second embodiment of the invention, a reservation query may be made for a conference which utilizes two MMS units.

In response to a reservation query involving two MMS units, the acceptance system according to a second embodiment of the invention accesses the database of reserved resources for each MMS and builds a list for each MMS of the resources requested in the query together with the times during which those resources are already reserved. One of the MMS units is considered to be a master and the other is considered to be a slave. Designation of the master may be based on a number of criteria. However, the simplest criterion is to designate the MMS with the most participants connected to it as the master. The master and the slave will be coupled to each other by N-number of network ports where the number N is specified in the query. The type of ports used to couple the master and slave will be chosen by the acceptance system and are not specified in the query. The reservation lists for the master and the slave MMS units are expanded in the same manner as described above with reference to FIGS. 3 and 4 to form two lists of resources where each record in the list includes a resource identification, a time, and an indication of whether the time is the start of a reserved period or the end of a reserved period. These expanded lists are sorted by the time field in the same manner as described above with reference to FIG. 5 and are used to create two two-dimensional resource availability matrices, one for each MMS. FIG. 8a shows an example of a Resource Availability Matrix for the master MMS and FIG. 8b shows an example of a Resource Availability Matrix for the slave MMS. It will be appreciated that the times MT1–MT6 in the master matrix will not necessarily coincide with the times ST1–ST9 in the slave matrix. In order to further process the reservation query, therefore, a Consolidated Resource Availability Matrix (CRAM) must be generated for the master MMS and for the slave MMS. The MCRAM (master CRAM) is generated from the master RAM by deleting rows which correspond to time periods which fall outside the time periods in the slave RAM and by inserting additional rows which correspond to time periods in the slave RAM. For purposes of the example shown in FIGS. 8a and 8b, it will be assumed that the times MT1<ST1<ST2<MT2<MT3<ST3<ST4<ST5<ST6<MT4< MT5<ST7<ST8<MT6<ST9. It will therefore be appreciated that the earliest time at which information is available for both the master MMS and the slave MMS is at time ST1 and the latest time at which information is available for both the master MMS and the slave MMS is at time MT6

Referring now to FIGS. 8a, 8b, 9a, and 9b, the MCRAM of FIG. 9a is created from the master RAM of FIG. 8a and the slave RAM of FIG. 8b. The first row of the MCRAM indicates the status of resources in the master MMS at time ST1. As shown in FIGS. 8a and 9a, the resource availability for this row is the same as indicated in row MT1 in the master RAM. It will be understood that the master RAM indicates that the resource availability at time MT1 will remain the same until time MT2. As explained above, since MT1<ST1<ST2<MT2, the resources available at the master MMS during times ST1 and ST2 will be the same as indicated at MT1. With the foregoing in mind, it should be understood that the MCRAM shown in FIG. 9a and the slave CRAM (SCRAM) shown in FIG. 9b are each built by interleaving rows for times at which resource availability changes on the other MMS unit. These interleaved rows include the same availability data as the row they follow since at these times resource availability on the MMS to which the CRAM refers does not change. The resulting MCRAM and SCRAM provide information about the resource availability in the respective MMS units at all critical times.

After the Consolidated Resource Availability Matrices are generated, they are subjected to a multi-step analysis to determine the time periods during which the requested resources are available as well as the time periods during which sufficient ports are available for the two MMS units to communicate with each other. According to the invention, the availability of network ports is determined first and the network ports are "reserved" prior to determining the availability of other resources. After the availability of network ports is established, the Consolidated Ram Availability Matrices are analyzed together to determine which common set of resources are available for each time period.

According to a presently preferred embodiment of the invention, the analysis of the Consolidated Resource Availability Matrices is performed using several functions which are defined below and where the following notation is used:

ru(a,b,c) is used to denote the number of resources of particular types which are required to accommodate remote users. E.g., "a" copies of VIP-1, "b" copies of VIP-2, and "c" copies of VIP-4. It will be understood, however, that this notation can be generalized for any number of resource types.

CP is used to denote the number of cascading ports required for the conference.

$CRAM_t$ is used to denote an array indicating which resources are available at time t. In other words $CRAM_t$ is one row from one of the matrices indexed by time t. Examples of this notation include $MCRAM_{mt2}$ which indicates the row at time mt2 in the master CRAM and $SCRAM_{st2}$ which indicates the row at time st2 in the slave CRAM.

$CRAM_t(x,y,z)$ is used to denote the fact that x copies of VIP-1, y copies of VIP-2, and z copies of VIP-4 are available at time t.

With this notation in mind, the following functions are defined according to the invention and are used to analyze the CRAMs. The first function HMIN, horizontal minimum, is used to assure that the correct number of matching ports are available on each MMS for cascading. HMIN is defined as Equation 1 below.

$$\text{HMIN } (MCRAM_i(x,y,z), SCRAM_i(r,s,t)) = \{\min(x-a,r), \min(y-b,s), \min(z-c,t)\} \quad (1)$$

The HMIN function first removes the user network ports that are to be used from the MCRAM and then performs a simple MIN function for each of the corresponding remaining ports. It will be appreciated that the result of the HMIN function will be a set of integers. According to the invention, the sum of these integers will be compared to CP as a first test to determine whether there are sufficient cascading network ports at time t.

The second function VMIN, vertical minimum; is used to assure that for any given time period the same set of resources is available for the duration of the period. VMIN, which is defined as Equation 2 below, operates as a bitwise AND similar to the MIN function described above with respect to the first embodiment of the invention.

$$\text{VMIN}(CRAM_t, CRAM_{t+1}, \ldots, CRAM_{t+n}) = \min(CRAM_t, CRAM_{t+1}, \ldots, CRAM_{t+n}) \quad (2)$$

The third function MSAT, which is defined below as Equation 3, is a Boolean function which is used to determine whether there are sufficient resources on the Master MMS to support remote users.

$$\text{MSAT}(MCRAM_t(x,y,z), ru(a,b,c)) = \text{TRUE iff} \{x \geq a \text{ and } y \geq b \text{ and } z \geq c\} \quad (3)$$

Those skilled in the art will appreciate that the functions defined above are applied iteratively to each row of the CRAMs in much the same manner as the iterative analysis described above with reference to FIG. 7. Therefore, the following notation is used to define iterative application of the functions:

$M_t^n$ denotes $\text{VMIN}(MCRAM_t, MCRAM_{t+1}, \ldots, MCRAM_{t+n})$;

$S_t^n$ denotes $\text{VMIN}(SCRAM_t, SCRAM_{t+1}, \ldots, SCRAM_{t+n})$; and

|CRAM| denotes the number of rows in the CRAM.

According to the invention, the analysis of the CRAMs will return a list of available periods (AP) each having a start time and an end time during which a conference may be reserved (a reservation may be accepted). The analysis utilizing the above-defined functions is carried out in the following eleven steps beginning with i=1 and p=1:

1  if $\text{SUM}(\text{HMIN}(MCRAM_i(x,y,z), SCRAM_i(r,s,t))) < CP$ goto step 10 else set $AP_p$.start_time=i and continue
2  Let j=1
3  Compute $M_i^j$
4  if $\text{MSAT}(M_i^j, ru(a,b,c))$ is FALSE goto step 8 else continue
5  Compute $S_i^j$
6  if $\text{SUM}(\text{HMIN}(M_i^j, S_i^j)) < CP$ goto step 8 else continue
7  Let j=j+1; if $J \leq |CRAM|$ goto step 3 else continue
8  Set $AP_p$.end_time=i+j; if $|AP_p|$<duration reject $AP_p$ and goto step 10 else continue
9  Set resources available during $|AP_p|$ as $(M_i^{j-1}, S_i^{j-1})$
10 Let i=i+1; if I<|CRAM| goto step 1 else continue
11 report list of times to user; save times and resource ids for reservation According to the invention, the cascaded ports are chosen from the same pool of network ports which is used to support the remote users. This makes optimal use of the resources so that cascaded reservations and non-cascaded reservations are given equal priority. It will be appreciated that any network port can be used for cascading provided that matching types of ports can be found on both the master and the slave MMS.

Referring now to FIGS. 9a and 9b and the process listing above, the reservation acceptance process according to the invention will be illustrated for a query wherein the master MMS requires one VIP1 port and two VIP2 ports for remote users and also requires two network ports (cascaded ports) to connect to the slave MMS. The first step in the process is to perform the HMIN function for time ST1. HMIN $(MCRAM_{ST1}(4,2,2), SCRAM_{ST1}(2,3,2)) = \{\min(4-1,2), \min(2-2,3), \min(2-0,2)\}$ The HMIN function yields a result of 2,0,2. This set of integers is summed to yield a result of 4 which is compared to the number of cascading ports required, i.e. 2. Since the result of the sum is greater than or equal to the number of required cascading ports, the $AP_1$.start_time is set to ST1.

The next step in the process is to compute $M_{ST1}^1$ which is the MIN of the first two rows of the MCRAM. This yields a one dimensional matrix with the value 1111110011. This matrix is read as indicating 4 VIP1 ports available, 2 VIP2 ports available, and 2 VIP4 ports available. This set 4,2,2 is compared to the required user resources 1,2,0 using the MSAT function where it is determined that the required user resources in the master MMS are available for the time starting at ST1 and ending at MT2.

Next the slave CRAM is analyzed to compute $S_{ST1}^1$ which is the MIN of the first two rows of the SCRAM. This yields a one dimensional matrix with the value 1100010101. This matrix is read as indicating 2 VIP1 ports available, 2 VIP2 ports available, and 1 VIP4 ports available. This set 2,2,1 is compared (using HMIN) to the set 4,2,2 derived with the $M_{ST1}^1$ function and to the required user resources 1,2,0.

HMIN $(M_{ST1}^1(4,2,2), S_{ST1}^1(2,2,1) = \{\min(4-1,2), \min(2-2,2),$ $\min(2-0,1)\}$ The HMIN function yields a result of 2,0,1. This set of integers is summed to yield a result of 3 which is compared to the number of cascading ports required, i.e. 2. Since the result of the sum is greater than or equal to the number of required cascading ports, the process now continues to examine the next row (MT2) in the CRAMS in order to determine whether the reservation may be accepted for the time period starting at ST1 and ending at MT3.

The function $M_{ST1}^2$ is performed which is the MIN of the first three rows of the MCRAM. This yields a one dimensional matrix with the value 1000110011. This matrix is read as indicating 1 VIP1 ports available, 2 VIP2 ports available, and 2 VIP4 ports available. This set 1,2,2 is compared to the required user resources 1,2,0 using the MSAT function where it is determined that the required user resources in the master MMS are available for the time period starting at ST1 and ending at MT3.

Next the slave CRAM is analyzed to compute $S_{ST1}^2$ which is the MIN of the first three rows of the SCRAM. This yields a one dimensional matrix with the value 1100010101. This matrix is read as indicating 2 VIP1 ports available, 2 VIP2 ports available, and 1 VIP4 ports available. This set 2,2,1 is compared (using HMIN) to the set 1,2,2 derived with the $M_{ST1}^2$ function and to the required user resources 1,2,0. HMIN $(M_{ST1}^2(1,2,2), S_{ST1}^2(2,2,1) = \{\min(1-1,2), \min(2-2,2),$ $\min(2-0,1)\}$ The HMIN function yields a result of 0,0,1. This set of integers is summed to yield a result of 1 which is compared to the number of cascading ports required, i.e. 2. Since the result of the sum is less than the number of required cascading ports, it is determined that the conference cannot continue to the time MT3. Therefore the $AP_1$.end_time is set to MT2 and the first interval during which a conference reservation may be accepted is now determined. This interval is compared to the conference duration requested. If the duration requested is greater than the interval, the interval is rejected. Otherwise, the interval $AP_1$ is saved together with a list of the resources on both the master MMS and the slave MMS which must be used during this interval. The resources are identified by the one dimensional matrices $M_{ST1}^1$ and $S_{ST1}^1$.

The process now returns to the first step to determine the longest interval starting with time ST2. Applying the first step SUM(HMIN(MCRAM$_{ST2}$(4,2,2),SCRAM$_{ST2}$(3,3,1))) yields a result of 4 which is greater than the number of required network ports. A starting time $AP_2$.start_time is set to ST2.

The next step in the process is to compute $M_{ST2}^1$ which is the MIN of the second and third row of the MCRAM. This yields a one dimensional matrix with the value 1000110011. This matrix is read as indicating 1 VIP1 port available, 2 VIP2 ports available, and 2 VIP4 ports available. This set 1,2,2 is compared to the required user resources 1,2,0 using the MSAT function where it is determined that the required user resources in the master MMS are not available for the time starting at ST2 and ending at MT3. Therefore the $AP_2$.end_time is set to MT2. It will be appreciated that the interval $AP_2$ is a subset of the interval $AP_1$. Although not included in the process listing above, it is preferred that subset intervals be ignored.

The process now returns to the first step to determine the longest interval starting with time MT2. The process continues until each row of the CRAMs has been examined and compared to each succeeding row. From the foregoing, it will be appreciated that the process generates a list of intervals $AP_p$, each having a starting time and an ending time and each interval having a list of resources which must be used on the master MMS ($M_i^j$) and on the slave MMS ($S_i^j$) during that interval.

The list of available time periods for the conference is returned to the person who made the reservation query. The person chooses the time period from the list of available periods and the reservation is booked using the list of resources. As mentioned above, sometimes the list of resources which must be used includes more resources than are actually needed and a choice of resources is therefore available. In the case of non-cascading reservations, the choice of resources can be made at random or according to any method desired. In the case of cascading reservations, the master MMS resources needed for remote users are chosen first and subtracted from the list of master MMS resources. The depleted list of master MMS resources is then compared to the list of slave MMS resources using VMIN to determine which ports can be used to couple the master and slave MMS units.

From the foregoing, those skilled in the art will appreciate that the second embodiment of the invention can also be used to indicate the availability of flexible resources in the same manner as the first embodiment. When a query specifies flexible resources as well as required resources, the acceptance process returns a report to the user indicating the time periods during which required resources are available and also a list of time periods during which both required and flexible resources are available.

Figure 10B:
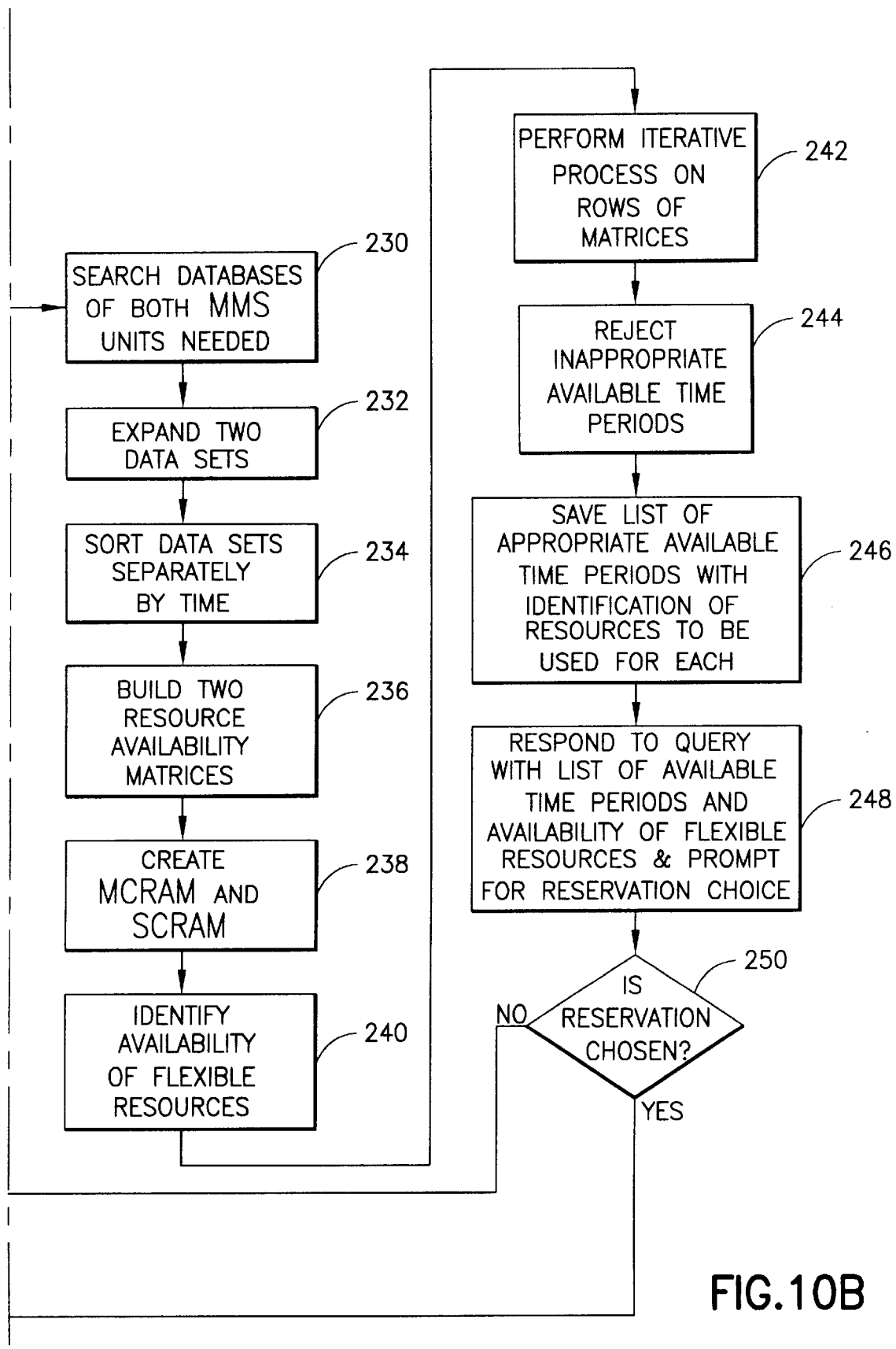
FIG. 10 is a flow chart illustrating an exemplary implementation of the reservation acceptance system of the invention.

Turning now to FIG. 10, and in light of the above disclosure, an exemplary reservation acceptance system combines the features of both the first and second embodiments of the invention so that a single system may handle different types of reservation queries. The reservation query is read at 200 and it is determined at 202 whether the query involves two MMS units. If the query involves only one MMS unit, the database for the needed unit is searched at 204. The data is expanded at 206 in the manner described above with reference to FIGS. 3 and 4. The data is sorted at 208 in the manner described above with reference to FIG. 5. The data is used to build a Resource Availability Matrix at 210 in the manner described above with reference to FIG. 6. The availability of Flexible Resources is obtained at 212 in the manner described above with reference to FIG. 5. The matrix is analyzed at 214 in the manner described above with reference to FIG. 7 to obtain the time periods during which required resources are available. Inappropriate time periods are deleted from the list at 216 as described above with reference to site availability, participant availability, etc. which were specified in the reservation query. The list of times and resources is stored at 218 and a response to the user is sent at 220. The response also preferably includes a query from the acceptance system to the user to choose one of the periods in the list to book a conference. If the user chooses to reserve a conference, it is determined at 222 and the conference is booked at 224 by updating the database for the affected MMS unit, the acceptance system then ends at 226 to await another query. Also, if, at 222 it is determined that the user chooses not to book a reservation at this time, the acceptance system then ends at 226 to await another query.

If the reservation read at 200 is determined at 202 to require two MMS units, the databases of both MMS units are searched at 230, the data is expanded at 232, sorted at 234, and two Resource Availability Matrices are built at 236. A Master Consolidated Resource Availability Matrix and a Slave Consolidated Resource Availability Matrix are built at 238 in the manner described above with reference to FIGS. 8a, 8b, 9a, and 9b. If flexible resources are part of the query, their availability is identified at 240. Required resource availability is determined at 242 utilizing the iterative process described above and inappropriate time periods are rejected at 244. The list of times and resources is stored at 246 and a response to the user is sent at 248. The response also preferably includes a query from the acceptance system to the user to choose one of the periods in the list to book a conference. If the user chooses to reserve a conference, it is determined at 250 and the conference is booked at 224 by updating the database for the affected MMS units, the acceptance system then ends at 226 to await another query. Also, if, at 250 it is determined that the user chooses not to book a reservation at this time, the acceptance system then ends at 226 to await another query.

There have been described and illustrated herein several embodiments of a multimedia multipoint telecommunications reservation acceptance system and controller. While particular embodiments of the invention have been described, it is not intended that the invention be limited thereto, as it is intended that the invention be as broad in scope as the art will allow and that the specification be read likewise. Thus, while particular exemplary MMS resources have been disclosed, it will be appreciated that in practice almost any MMS resources could be managed by the system. Also, while matrices with particular dimensions have been shown, it will be recognized that in practice the matrices built according to the acceptance process may have different dimensions. Moreover, while particular configurations have been disclosed in reference to the coupling of the reservation controller to the network, it will be appreciated that other configurations could be used as well and the acceptance system could be used in other reservation controller configurations. Furthermore, while the iterative processes have been disclosed as having a certain number of steps, it will be understood that combining some steps or breaking some steps into multiple steps can achieve the same or similar function as disclosed herein. It will therefore be appreciated by those skilled in the art that yet other modifications could be made to the provided invention without deviating from its spirit and scope as so claimed.

What is claimed is:

1. A multimedia multipoint telecommunications reservation acceptance system for use with at least one multipoint multimedia server (MMS) having a plurality of resources and for responding to a reservation query which specifies resources required for a telecommunications conference, said system comprising:
   a) means for reading the reservation query;
   b) database means for storing reservation information about the resources of the at least one MMS;
   c) database search means for determining times at which certain of the resources of the at least one MMS have been reserved;
   d) means for building a first resource availability matrix containing information regarding availability of resources of the at least one MMS in chronological order;
   e) means for analyzing the first matrix to determine time periods during which the resources required for the telecommunications conference are available;
   f) means for reporting the time periods in response to the query;
   g) means for accepting a request to reserve one or more of the time periods; and
   h) means for updating said database means with information about the time periods reserved in the request.

2. A system according to claim 1, wherein:
said means for reading the reservation query permits the reservation query to specify flexible resources in addition to the required resources;
said means for analyzing includes means for determining time periods during which the flexible resources for the telecommunications conference are available; and
said means for reporting includes means for reporting the time periods during which the resources required for the telecommunications conference are available and time periods during which both the required resources and the flexible resources for the telecommunications conference are available.

3. A system according to claim 1, further comprising:
i) means for comparing the time periods to other criteria specified in the reservation query.

4. A system according to claim 3, wherein:
said other criteria includes one of site availability, participant availability, and conference duration.

5. A system according to claim 1, wherein:
said means for building includes means for listing times at which availability of required resources changes and means for indicating for each listed time the availability of required resources; and
said means for analyzing includes means for comparing the availability of required resources at one listed time to the availability of required resources at another listed time.

6. A system according to claim 5, wherein:
said means for listing includes means for listing each time the availability of required resources changes as a first dimension of the first matrix; and
said means for indicating includes means for indicating the availability of each required resource at each listed time as a second dimension of the first matrix.

7. A system according to claim 1, wherein:
said database means includes means for storing reservation information about the resources of a first MMS and a second MMS;
said database search means includes means for determining times at which certain of the resources of the first MMS have been reserved and means for determining times at which certain of the resources of the second MMS have been reserved;
said means for building includes means for building a first resource availability matrix containing information regarding the availability of required resources of the first MMS in chronological order and means for building a second resource availability matrix containing information regarding the availability of required resources of the second MMS in chronological order; and
said means for analyzing includes means for analyzing the first matrix and the second matrix to determine the time periods during which the resources required for the telecommunications conference are available.

8. A system according to claim 7, wherein:
said means for building includes means for listing times at which availability of required resources changes and means for indicating for each listed time the availability of required resources; and
said means for analyzing includes means for comparing the availability of required resources at one listed time to the availability of required resources at another listed time.

9. A system according to claim 8, wherein:

said means for listing includes means for listing each time the availability of required resources of the first MMS changes as a first dimension of the first matrix and means for listing each time the availability of required resources of the second MMS changes as a first dimension of the second matrix; and said means for indicating includes means for indicating the availability of each required resource at each time listed in the first matrix as a second dimension of the first matrix and means for indicating the availability of each required resource at each time listed in the second matrix as a second dimension of the second matrix.

10. A system according to claim 9, wherein:

said means for building includes means for combining the first dimensions of the first and second matrices so that the first and second matrices have the same first dimensions.

11. A system according to claim 10, wherein:

said means for analyzing includes means for determining availability of resources of the first MMS and resources of the second MMS for the first MMS and the second MMS to communicate with each other.

12. A multimedia multipoint telecommunications reservation acceptance system for use with at least one multipoint multimedia server (MMS) having a plurality of resources and for responding to a reservation query which specifies resources required for a telecommunications conference and flexible resources which are desirable but not required for the telecommunications conference, said system comprising:

a) means for reading the reservation query;

b) database means for storing reservation information about the plurality of resources of the at least one MMS;

c) database search means for determining times at which certain of the plurality of resources of the at least one MMS have been reserved;

d) means for determining availability of the resources required and the flexible resources for the telecommunications conference with respect to the at least one MMS;

e) means for reporting time periods in response to the reservation query indicating times when the resources required are available and times when both the resources required and the flexible resources are available;

f) means for accepting a request to reserve one or more of the time periods; and g) means for updating said database means with information about the time periods reserved in the request.

13. A system according to claim 12, further comprising:

h) means for comparing the time periods to other criteria specified in the reservation query.

14. A system according to claim 13, wherein:

said other criteria includes one of site availability, participant availability, and conference duration.

15. A system according to claim 12, wherein:

said database means includes means for storing reservation information about the resources of a first MMS and a second MMS; and said database search means includes means for determining times at which certain of the resources of the first MMS have been reserved and means for determining times at which certain of the resources of the second MMS have been reserved; and said means for determining includes means for determining the availability of required resources of the first MMS and means for determining the availability of required resources of the second MMS.

16. A system according to claim 15, wherein:

said means for determining includes means for determining availability of resources of the first MMS and resources of the second MMS for the first MMS and the second MMS to communicate with each other.

* * * * *